(12) United States Patent
Hashimoto et al.

(10) Patent No.: US 9,791,349 B2
(45) Date of Patent: Oct. 17, 2017

(54) END PLAY MEASUREMENT APPARATUS (71) Applicant: MITSUBISHI ELECTRIC CORPORATION, Chiyoda-ku, Tokyo (JP)

(72) Inventors: Michinori Hashimoto, Tokyo (JP); Shinsaku Maeda, Tokyo (JP); Hideo Terasawa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 189 days.

(21) Appl. No.: 14/784,702

(22) PCT Filed: Jun. 13, 2013

(86) PCT No.: PCT/JP2013/066333
§ 371 (c)(1),
(2) Date: Oct. 15, 2015

(87) PCT Pub. No.: WO2014/199483
PCT Pub. Date: Dec. 18, 2014

(65) Prior Publication Data
US 2016/0146701 A1    May 26, 2016

(51) Int. Cl.
*F16C 25/06*    (2006.01)
*G01M 13/04*    (2006.01)
(Continued)

(52) U.S. Cl.
CPC .............. *G01M 13/04* (2013.01); *B61C 9/50* (2013.01); *F16C 19/364* (2013.01); *F16C 19/52* (2013.01);
(Continued)

(58) Field of Classification Search
CPC ....... F16C 25/06; F16C 19/364; G01M 13/02; G01M 13/04
See application file for complete search history.

(56) References Cited

U.S. PATENT DOCUMENTS 2,185,142 A * 12/1939 Buckwalter ............. B60B 37/08
254/124
2,880,041 A * 3/1959 Brownyer ............... F16C 25/06
384/563
(Continued)

FOREIGN PATENT DOCUMENTS

JP    57-124120 A    8/1982
JP    4-117919 U    10/1992
(Continued)

OTHER PUBLICATIONS

International Search Report (PCT/ISA/210) mailed on Aug. 13, 2013, by the Japanese Patent Office as the International Searching Authority for International Application No. PCT/JP2013/066333.
(Continued)

*Primary Examiner* — David A Rogers
(74) *Attorney, Agent, or Firm* — Buchanan Ingersoll & Rooney PC (57) ABSTRACT

An end play measurement apparatus is provided that measures end play of a tapered roller bearing of a gear unit. The gear unit supports a large-gear shaft, with which a gear is fitted, via the tapered roller bearing. The end play measurement apparatus includes a power generation unit, which is fixed to the large-gear shaft and generates power to move the gear unit backward and forward in the axial direction, a position change unit, which is interposed between the power generation unit and the gear unit and changes the axial position of the gear unit by using the power of the power generation unit, and a booster mechanism, which has a free
(Continued)

end that receives the power of the power generation unit to boost the power.

2 Claims, 6 Drawing Sheets

(51) Int. Cl.
*F16H 57/022* (2012.01)
*G01B 5/14* (2006.01)
*F16C 19/36* (2006.01)
*F16C 19/54* (2006.01)
*B61C 9/50* (2006.01)
*F16C 19/52* (2006.01)
*G01B 21/16* (2006.01)

(52) U.S. Cl.
CPC ............ *F16C 19/548* (2013.01); *F16C 25/06* (2013.01); *F16H 57/022* (2013.01); *G01B 5/146* (2013.01); *G01B 21/16* (2013.01); *F16H 2057/0221* (2013.01)

(56) References Cited

U.S. PATENT DOCUMENTS

| | | | | |
|---|---|---|---|---|
| 3,890,015 A * | 6/1975 | Harbottle | ............. | F16C 19/364 384/571 |
| 4,054,999 A * | 10/1977 | Harbottle | ............. | F16C 19/364 29/407.06 |
| 4,150,468 A * | 4/1979 | Harbottle | ............. | F16C 19/364 29/898.09 |
| 4,337,649 A * | 7/1982 | Stagg | ................... | G01M 13/02 73/115.01 |
| 4,492,018 A * | 1/1985 | Rode | ...................... | F16C 25/08 29/283.5 |
| 4,611,935 A * | 9/1986 | Rode | ......................... | F16H 1/14 384/548 |
| 5,046,870 A * | 9/1991 | Ordo | ....................... | F16C 25/06 384/563 |
| 5,058,424 A * | 10/1991 | O'Hara | ................. | F16C 19/548 29/252 |
| 5,125,156 A * | 6/1992 | Witte | ...................... | B25B 23/14 29/407.03 |
| 5,129,156 A * | 7/1992 | Walker | ...................... | B61C 9/50 29/803 |
| 5,386,630 A * | 2/1995 | Fox | ......................... | B23P 19/04 29/407.08 |
| 6,058,767 A * | 5/2000 | Calvin | .................. | G01M 13/04 33/517 |
| 6,460,423 B1 * | 10/2002 | Keller | .................. | F16C 19/386 73/862.392 |
| 6,490,935 B1 * | 12/2002 | Joki | ...................... | G01L 3/1464 73/862.49 |
| 7,428,779 B2 * | 9/2008 | Smith | ...................... | G01B 5/14 29/273 |
| 8,359,936 B2 * | 1/2013 | Rode | ........................ | F16C 25/06 33/517 |
| 8,474,330 B1 * | 7/2013 | Rode | ..................... | G01M 13/04 29/724 |
| 8,844,382 B1 * | 9/2014 | Rode | ..................... | G01M 13/04 73/862.23 |
| 2012/0079892 A1* | 4/2012 | Rode | ....................... | F16C 25/06 73/862.23 |

FOREIGN PATENT DOCUMENTS

JP    5-87761    12/1993
JP    2004-011892 A    1/2004

OTHER PUBLICATIONS

Written Opinion (PCT/ISA/237) mailed on Aug. 13, 2013, by the Japanese Patent Office as the International Searching Authority for International Application No. PCT/JP2013/066333.

* cited by examiner

END PLAY MEASUREMENT APPARATUS

FIELD

The present invention relates to an apparatus that measures end play of a bearing for use in a gear unit of a rail vehicle.

BACKGROUND

A rail vehicle is provided with a drive system, which is disposed under the floor of the vehicle and mainly includes a truck frame, a main motor placed on the truck frame, and a gear unit coupled to the main motor and a large-gear shaft. The gear unit reduces the number of rotations of the main motor and transmits the driving force to the large-gear shaft.

The gear unit incorporates in its inside a high-speed small gear fixed to a small-gear shaft, a low-speed large gear fixed to the large-gear shaft and in mesh with the small gear, and a gear case housing the small gear and the large gear.

The small gear and the large gear are retained in the gear case with bearings arranged at both ends of the gears in such a manner that the axes of the small gear and the large gear are parallel with each other. Tapered roller bearings, which are conical, and are capable of supporting radial and thrust loads and have large allowable loads, are used as these bearings.

To use a tapered roller bearing appropriately, it is important to manage the axial clearance (end play) between the bearing outer ring and the tapered rollers. In general, such end play is measured during the assembly at a plant and on other occasions with a dedicated measurement apparatus.

In a conventional technique described in Patent Literature 1, a gear unit is placed on a measurement stand and its gear case is pushed and polled with a load applied in the axial direction of the rotation shaft. A relative displacement of the large-gear shaft and the gear case in the axial direction is obtained by this operation. This relative displacement is measured as the end play of a tapered roller bearing.

CITATION LIST

Patent Literature

Patent Literature 1: Japanese Patent Application Laid-Open No. 2004-11892 (FIG. 1, etc.)

SUMMARY

Technical Problem

With the conventional technique described in Patent Literature 1, the end play of a gear unit cannot be measured with the gear unit as attached to a truck frame, which is equipped with many devices; thus, measuring the end play of a gear unit that is attached to a truck frame adds work to remove the gear unit from the truck frame and work to re-attach the gear unit to the truck frame after the measurement of the end play. It also requires a measurement stand or the like to place the removed gear unit on. Hence, the conventional technique poses a problem that the measurement of end play involves long work time and high work cost.

The present invention has been achieved in view of the above, and an object of the present invention is to provide an end play measurement apparatus that enables further reduction in work time and work cost involved in the measurement of end play.

Solution to Problem

According to an aspect of the present invention in order to solve the problems and achieve the object, there is provided an end play measurement apparatus that measures end play of a tapered roller bearing of a gear unit that supports a rotation shaft via the tapered roller bearing, the rotation shaft being fitted with a gear, the apparatus including: a power generation unit that is fixed to the rotation shaft and generates power to move the gear unit backward and forward in an axial direction; and a position change unit that is interposed between the power generation unit and the gear unit and changes an axial position of the gear unit by using the power of the power generation unit, wherein the position change unit comprises a booster mechanism that is positioned so as to be astride the rotation shaft and is formed into a substantially U-shape having ends that are coupled to the power generation unit and a free end that receives power of the power generation unit to boost the power and transmit the resultant power to the gear unit.

Advantageous Effects of Invention

In the present invention, a power generation unit is fixed on a large-gear shaft, and position change unit, which is driven by the power generation unit, is fixed on the gear case. Thus, the present invention produces an effect of using a limited space under a vehicle floor effectively such that end play can be measured and of being able to further reduce work time and work cost involved in the measurement of the end play.

DESCRIPTION OF EMBODIMENTS

An exemplary embodiment of an end play measurement apparatus according to the present invention will now be described in detail with reference to the drawings. The present invention is not limited to the embodiments.

Embodiment

Figure 1:
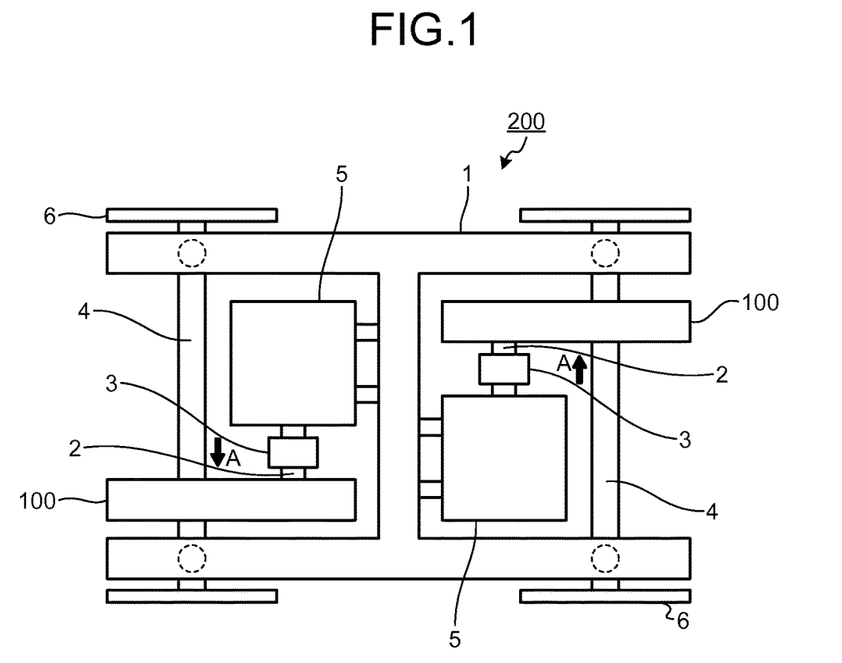
FIG. 1 is a diagram schematically illustrating a drive system provided under the floor of a rail vehicle.
Figure 2:
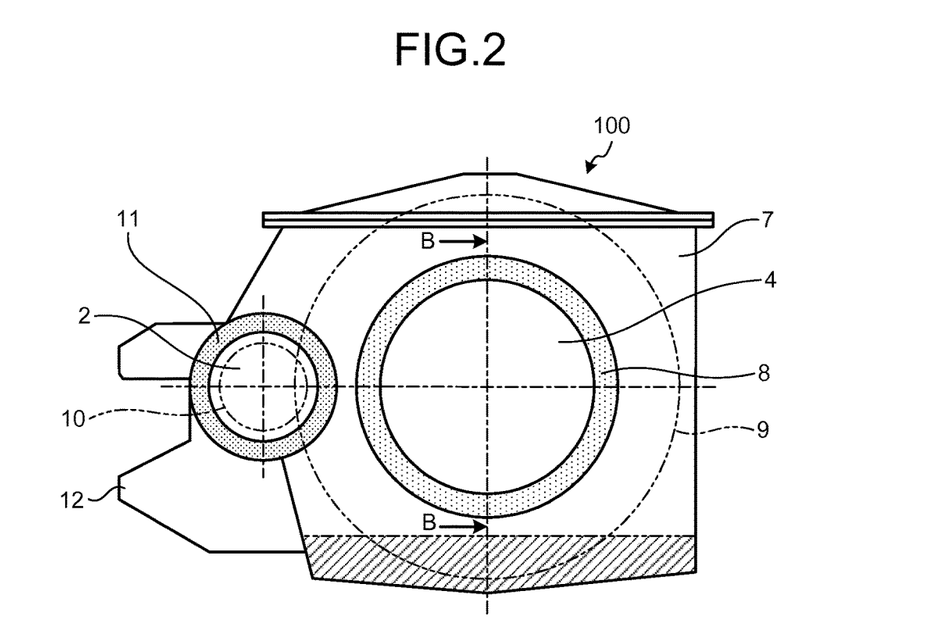
FIG. 2 is an outside drawing of a gear unit observed from the direction of the arrow A illustrated in FIG. 1.
Figure 3:
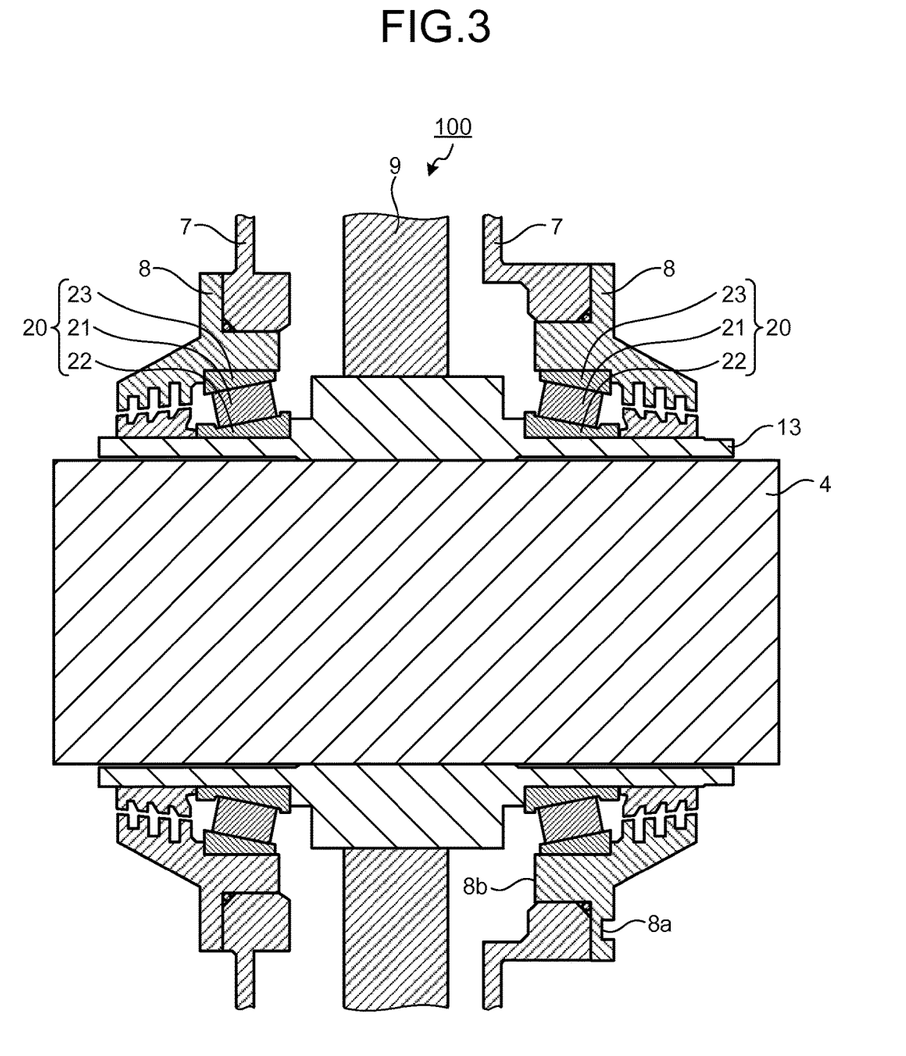
FIG. 3 is a sectional view of the gear unit.
Figure 4:
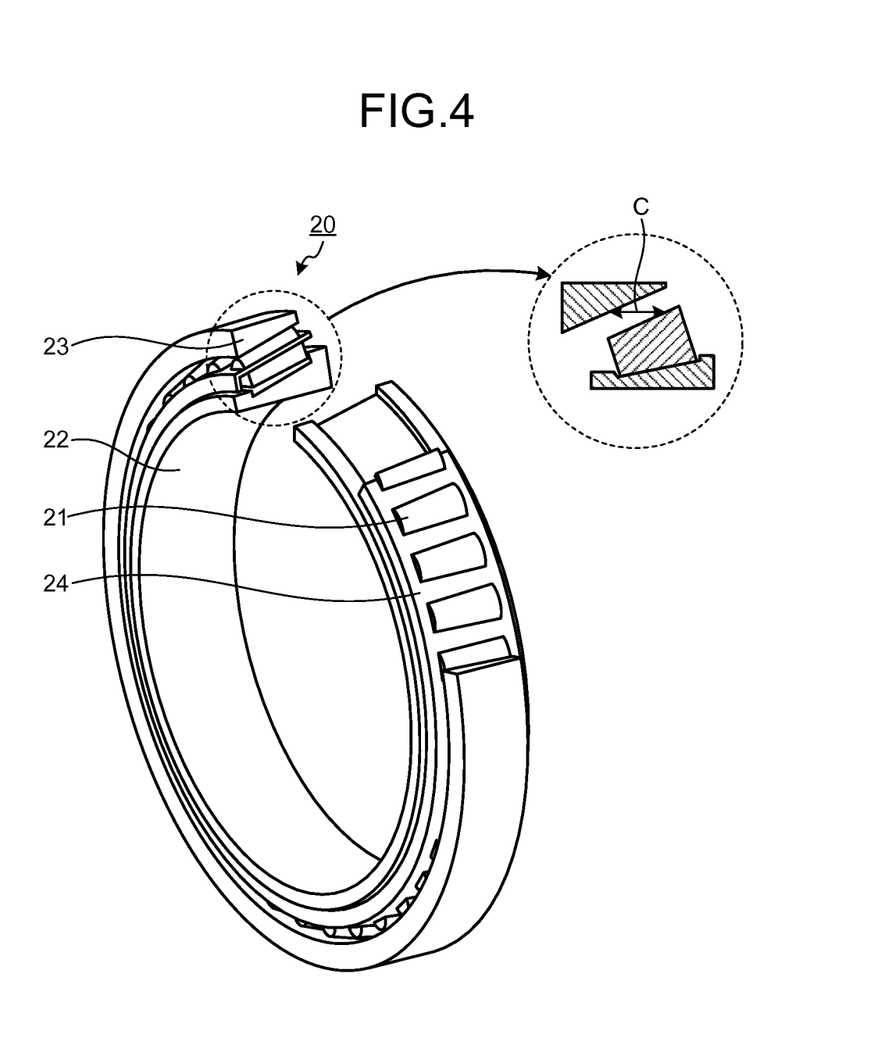
FIG. 4 is an exploded perspective view of a tapered roller bearing for use in the gear unit.
Figure 5:
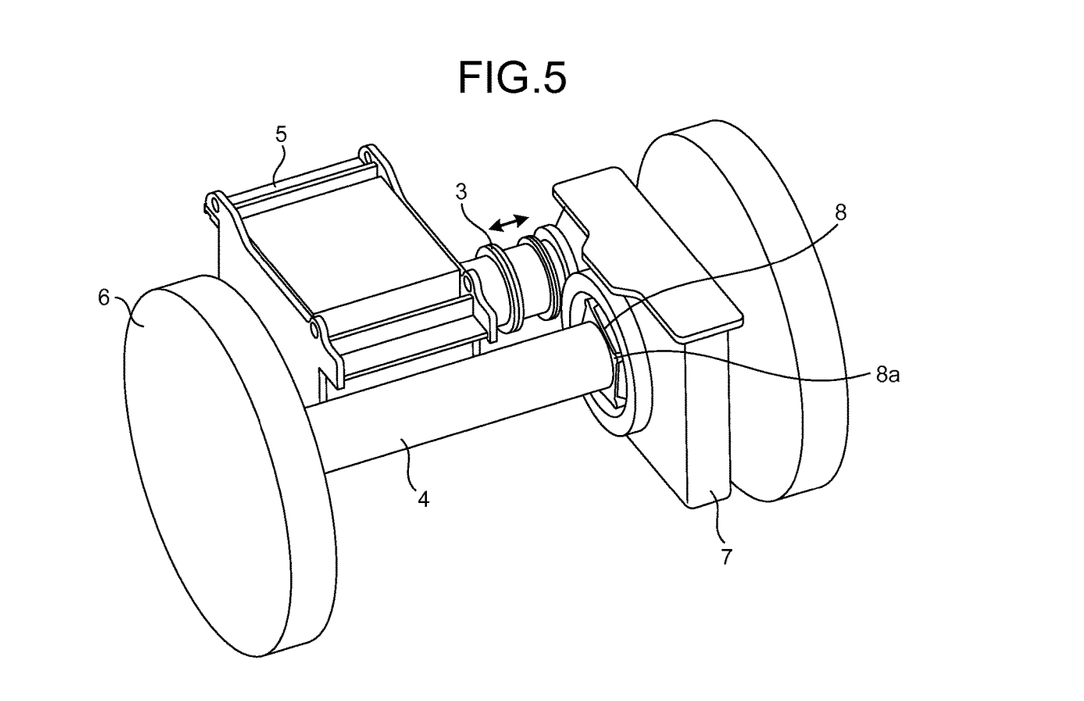
FIG. 5 is a perspective view schematically illustrating the gear unit, a main motor, and an axle.
Figure 6:
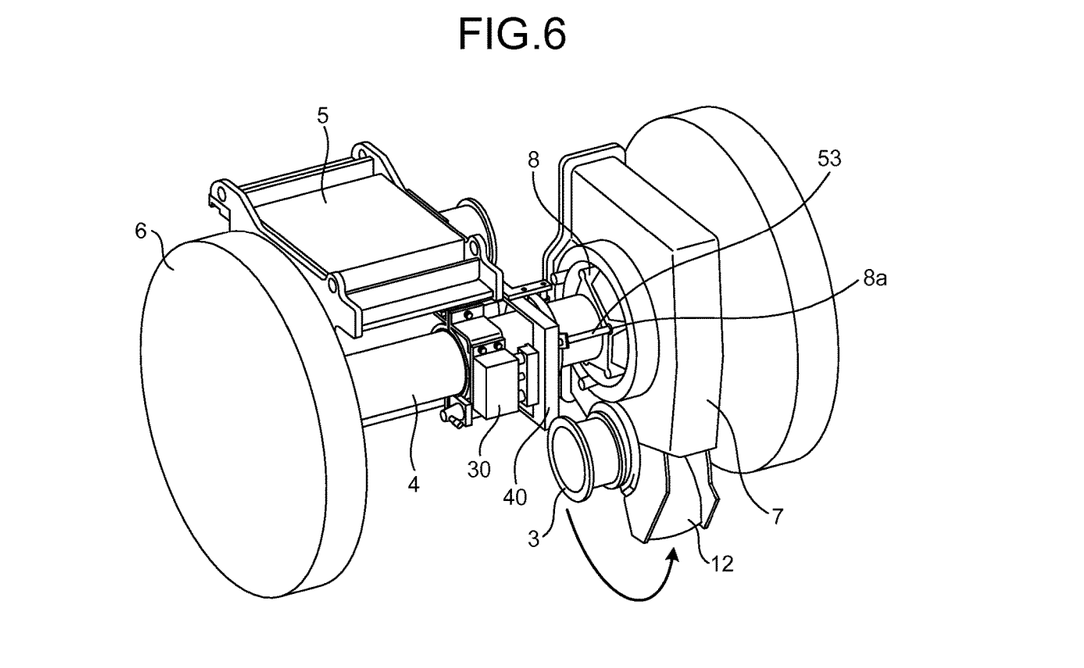
FIG. 6 is a perspective view of an end play measurement apparatus according to an embodiment of the present invention as attached to the axle.
Figure 7:
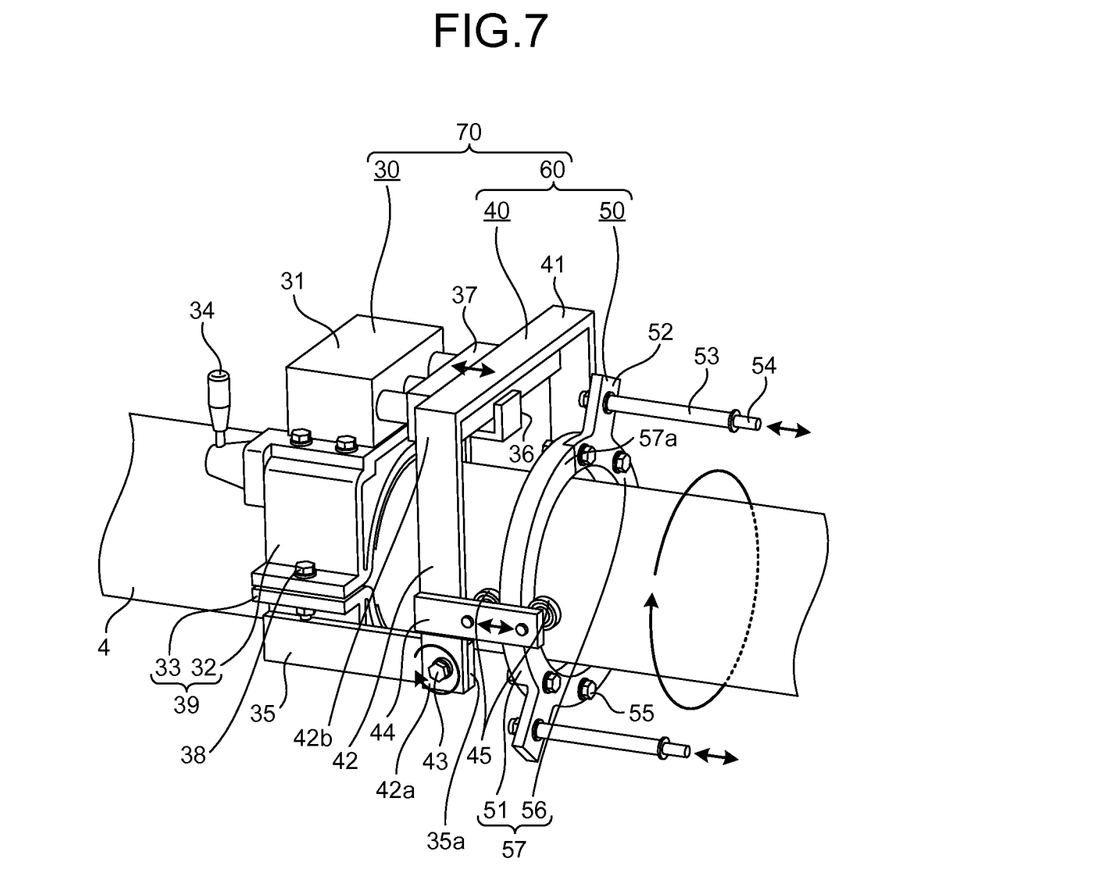
FIG. 7 is a perspective view of the end play measurement apparatus.
Figure 8:
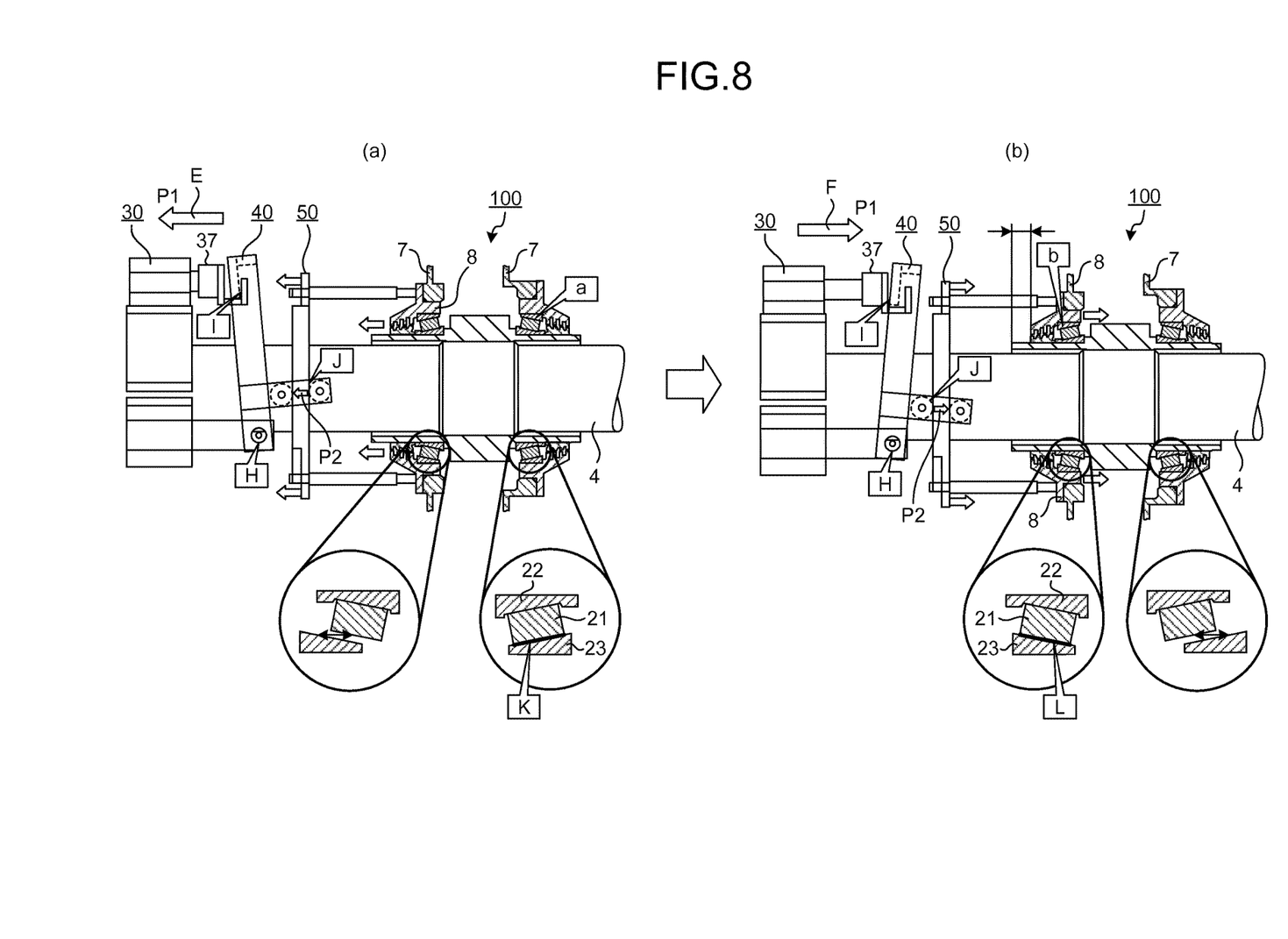
FIG. 8 is a diagram for describing the operation of the end play measurement apparatus.

FIG. 1 is a diagram schematically illustrating a drive system under the floor of a rail vehicle. FIG. 2 is an outside drawing of a gear unit observed from the direction of the arrow A illustrated in FIG. 1. FIG. 3 is a sectional view of the gear unit. FIG. 4 is an exploded perspective view of a tapered roller bearing for use in the gear unit. FIG. 5 is a perspective view schematically illustrating the gear unit, a main motor, and an axle. FIG. 6 is a perspective view of an end play measurement apparatus according to an embodiment of the present invention as attached to the axle. FIG. 7 is a perspective view of the end play measurement apparatus. FIG. 8 is a diagram for describing the operation of the end play measurement apparatus.

In FIG. 1, a drive system 200 for use in a rail vehicle is illustrated. The drive system 200 includes two main motors 5, which are placed on a truck frame 1, a large-gear shaft 4, which is rotatably placed on the truck frame 1 and provided with wheels 6 on its both ends, and a gear unit 100, which is coupled to one of the main motors 5 and the large-gear shaft 4, reduces the number of rotations of the main motor 5, and transmits the driving force to the large-gear shaft 4.

The gear unit 100 is a component that transmits the rotation of the main motor 5 to the large-gear shaft 4, with the number of rotations of the main motor 5 reduced. The large-gear shaft 4 is attached to the gear unit 100. The main motor 5 includes a rotation shaft that is coupled flexibly to a small-gear shaft 2 of the gear unit 100 by a flexible shaft coupling 3. This structure allows the rotational torque of the main motor 5 to be transmitted via the flexible shaft coupling 3 to the gear unit 100 such that the wheels 6 are rotated.

In FIG. 2, the gear unit 100 includes a small gear 10, which is fixed to the small-gear shaft 2 and in mesh with a large gear 9, the large gear 9, which is fixed to the large-gear shaft 4, a gear case 7, which houses the small gear 10 and the large gear 9, and a hanger seat portion 12 for mounting the gear unit 100 on the truck frame 1.

A small-gear bearing end lid 11 and a large-gear bearing end lid 8, which surround and support bearing outer rings, are fitted in the gear case 7.

The gear case 7 stores lubricant at its bottom. The height of the lubricant level is managed with an undepicted oil level meter or the like such that a part of the large gear 9 is immersed in the lubricant. The lubricant is raised by the rotation of the large gear 9 and supplied to portions of the large gear 9 and the small gear 10 where they are in mesh, a tapered roller bearing illustrated in FIG. 3 (hereinafter referred to as a "bearing 20"), and other places.

In FIG. 3, a section of the gear unit 100 observed from the direction of the arrow B in FIG. 2 is illustrated. A pair of the bearings 20, a quill shaft 13, which is provided rotatably on the bearings 20, the large-gear shaft 4, which is press-fitted in the quill shaft 13, the large gear 9, which is arranged on the outer periphery of the quill shaft 13, and a pair of the large-gear bearing end lids 8 are illustrated in FIG. 3.

The bearing 20 includes an inner ring 22, which rotates with the quill shaft 13, an outer ring 23, which is retained by the large-gear bearing end lid 8, and a plurality of tapered rollers (hereinafter referred to as "rollers 21"), which is placed rollably between the inner ring 22 and the outer ring 23. Although omitted in FIG. 4, the bearing 20 includes a retainer 24 (see FIG. 4) for preventing the rollers 21 from coming off the bearing 20 and preventing the rollers 21 from coming into contact with each other in the bearing 20.

The large-gear bearing end lid 8 is conical and fixed with a fastening member (not shown) that is screwed into a side face of the gear case 7 in a detachable manner for the maintainability of the bearing 20.

The large-gear bearing end lid 8 has an annular portion 8b, which protrudes toward the inside of the gear unit 100 and bolt insertion holes 8a, which are formed on the outside of the gear unit 100. The annular portion 8b is present between an outer circumferential surface of the outer ring 23 and the gear case 7 and has an inner circumferential surface that is in contact with the outer circumferential surface of the outer ring 23. The outer ring 23 of the bearing 20 is retained by the inner circumferential surface of the annular portion 8b and thus is separated from the rollers 21 when the large-gear bearing end lid 8 is detached.

The bolt insertion holes 8a are formed on a concentric circle having its center on the center of the large-gear shaft 4. In the present embodiment, two bolt insertion holes 8a are formed as an example. A threaded portion 54 of a rod 53 (see FIG. 7) is inserted into each of the bolt insertion holes 8a.

Each of the bolt insertion holes 8a is female threaded, and by screwing the threaded portion 54 of the rod 53 (see FIG. 7) into the bolt insertion hole 8a, a power transmission mechanism 50 is fixed to the large-gear bearing end lid 8. While the bolt insertion holes 8a are formed in the large-gear bearing end lid 8 in the present embodiment as an example, the positions of the bolt insertion holes 8a are not limited to those in the large-gear bearing end lid 8. The bolt insertion holes 8a may be formed in the gear case 7.

The gear unit 100 in the illustrated example has a labyrinth (small gaps) between the large-gear bearing end lid 8 and the quill shaft 13. The labyrinth is a mechanism for inhibiting the lubricant in the gear case 7 from leaking to the outside and for inhibiting outside dust and the like from entering the inside.

In FIG. 4, the detail configuration of the bearing 20 is illustrated. The bearing 20 of the gear unit 100 receives forces (a radial load and a thrust load) in a radial direction (in the radial direction of the bearing 20) and in an axial direction (in the direction parallel with the large-gear shaft 4) simultaneously due to the engagement of the small gear 10 and the large gear 9. Thus, the conical rollers 21, which are capable of supporting these loads, are used.

For the bearing 20 with the conical rollers 21, it is important to manage the end play (designated with C in the figure) between the outer ring 23 and the rollers 21 within an appropriate range. This is because, if the end play is larger than the appropriate range, abnormal vibration may result, and if the end play is smaller than the appropriate range, abnormal heating, caused by an insufficient supply of the lubricant into the bearing 20, may lead to seizure and thereby reduce the life of the bearing 20 significantly.

In the drive system 200, the main motor 5 is connected to the gear unit 100 and the large-gear shaft 4 is present near the main motor 5, as illustrated in FIG. 5. The components of the drive system 200 are mounted at a high density in a small space under the vehicle floor as described above and thus subject to significant spatial constraints.

Although the end play of the bearing 20 is normally adjusted during the assembly at a plant, the end play may be re-measured in a vehicle that has been put in commercial use. In the conventional technique, the gear unit 100 is removed from the truck frame 1 and placed on a measurement stand to avoid interference between the truck and devices. Then, the gear case 7 is pushed and pulled with a load applied in the axial direction of the large-gear shaft 4. A relative displacement of the large-gear shaft 4 and the gear case 7 in the axial direction is obtained by this operation and is measured as the end play.

An end play measurement apparatus 70 according to the present embodiment is configured to use the limited space under the vehicle floor effectively such that end play can be measured with the gear unit 100 as placed on the truck frame 1, in other words, with the large-gear shaft 4 as inserted in the gear unit 100. The structure and operation of the end play measurement apparatus 70 will now be described with reference to FIGS. 6 to 8.

In FIG. 6, the end play measurement apparatus 70, which is attached to the large-gear shaft 4 and the gear case 7 as used in a vehicle, in other words, as mounted on the truck frame 1, is illustrated. The gear case 7, the main motor 5, the wheels 6, and the large-gear shaft 4 in the illustrated example have a positional relationship similar to that as used in a vehicle.

In the illustrated example, the flexible shaft coupling 3 is detached from the main motor 5, leaving the gear case 7 connected only to the large-gear shaft 4. Additionally, the gear case 7 in the illustrated example has been turned approximately 90 degrees from the state in FIG. 5. The rod 53 of the end play measurement apparatus 70 is connected to the large-gear bearing end lid 8, and a power generation unit 30 of the end play measurement apparatus 70 is fixed to the large-gear shaft 4.

The detail configuration of the end play measurement apparatus 70 is illustrated in FIG. 7. The end play measurement apparatus 70 includes the power generation unit 30, which is fixed to the large-gear shaft 4, and a position change unit 60, which is interposed between the power generation unit 30 and the gear case 7 and changes the axial position of the gear case 7 relative to the large-gear shaft 4 by using power of the power generation unit 30. The position change unit 60 includes the power transmission mechanism 50 and a booster mechanism 40.

The booster mechanism 40 includes a pair of arm portions 42, which is positioned so as to be astride the large-gear shaft 4. The arm portions 42 have ends 42*b*, which are coupled by a coupling portion 41 to impart a substantially U-shape as observed in a plan view to the booster mechanism 40. The booster mechanism 40 has a free end (the coupling portion 41), which receives the power of the power generation unit 30 to boost the power and transmit the resultant power to the gear case 7.

The arm portions 42 have other ends 42*a*, which are connected by bolts 43 to ends 35*a* of support sections 35 rotatably. This configuration allows the coupling portion 41 of the booster mechanism 40 to pivot on the bolts 43, which serve as the fulcrum H (see FIG. 8).

A support section 44 is provided between the end 42*b* and the other end 42*a* of each of the arm portions 42. The pair of the support sections 44 is positioned so as to be astride the large-gear shaft 4 in the radial direction, and the support sections 44 are each shaped into a flat plate that extends from one of the arm portions 42 toward the gear unit 100.

The support sections 44 are positioned such that the distances from the bolts 43 to the support sections 44 are shorter than the distances from the bolts 43 to the coupling portion 41. While one of the support sections 44 on the near side of the large-gear shaft 4 is illustrated in FIG. 7, the other one of the support sections 44 is provided on the far side of the large-gear shaft 4.

A pair of rollers 45 is provided on a surface of each of the support sections 44 on the large-gear shaft 4 side. The two rollers 45 in a pair are positioned with a predetermined distance therebetween in the axial direction and sandwich the power transmission mechanism 50 in the axial direction.

The power generation unit 30 includes an annular assembly 39, an air cylinder 31, a power transmission portion 37, and a pair of the support sections 35. The annular assembly 39 has a shape similar to that of the outer circumferential surface of the large-gear shaft 4 and includes two fixing sections 32 and 33, which are each shaped substantially like the letter C as observed in a plan view. The fixing sections 32 and 33 are positioned such that the large-gear shaft 4 is interposed between the fixing sections 32 and 33 and coupled to each other in a circumferential direction with a fastener (for example, a bolt 38).

The air cylinder 31, which is a driving source to displace the gear case 7 (the large-gear bearing end lid 8) in the axial direction, is provided on the fixing section 32. The power transmission portion 37, which moves the coupling portion 41 of the booster mechanism 40 backward and forward in the axial direction (in the direction of the arrow in the figure), is provided on the air cylinder 31.

The power transmission portion 37 has at its end a hook 36, which engages on the coupling portion 41 of the booster mechanism 40. The hook 36 in the illustrated example is provided such that the hook 36 is interposed between the coupling portion 41 and the large-gear shaft 4 and engages on the coupling portion 41. Contact points between the hook 36 and the coupling portion 41 each act as the point of effort I (see FIG. 8) when the power generation unit 30 is operated.

Note that the structure of the power transmission portion 37 is not limited to the illustrated example and may be a structure other than the illustrated example as long as it can engage on the coupling portion 41 of the booster mechanism 40. Additionally, while the present embodiment uses the air cylinder 31 as the driving source to displace the gear case 7 (the large-gear bearing end lid 8) in the axial direction, another power source may be used in lieu of the air cylinder 31.

The pair of the support sections 35, which is positioned so as to be astride the large-gear shaft 4, is provided on the fixing section 33. The support sections 35 are parallel with the large-gear shaft 4 and each shaped into a flat plate that extends from the fixing section 33 toward the gear unit 100. While one of the support sections 35 on the near side of the large-gear shaft 4 is illustrated in FIG. 7, the other one of the support sections 35 is provided on the far side of the large-gear shaft 4. The arm portions 42 of the booster mechanism 40 are each connected rotatably by the bolt 43 to the end 35*a* of each of the support sections 35 on the gear unit 100 side.

The power transmission mechanism 50 includes an annular assembly 57, a pair of rod attachment portions 52, and the rods 53.

The annular assembly 57 includes segmented members 51 and 56, which are arranged such that the large-gear shaft 4 is interposed between the segmented members 51 and 56 and coupled to each other in the circumferential direction with a fastener (for example, a bolt 55). The segmented members 51 and 56 together have a shape similar to that of the outer circumferential surface of the large-gear shaft 4 and are each shaped substantially like the letter C as observed in a plan view.

The annular assembly 57 is arranged such that its axial end faces 57*a* are retained by the rollers 45. This configuration allows contact points between the rollers 45 and the annular assembly 57 to each act as the point of action J (see FIG. 8) when the power generation unit 30 is operated. Specifically, when the power transmission portion 37 is moved in the direction of the arrow E in FIG. 8 (toward the power generation unit 30), a force P2 corresponding to a force P1 is applied to one of the rollers 45 in each pair serving as the point of action J, according to the "principle of the lever" with the contact point between the arm portion 42 and each of the bolts 43 serving as the fulcrum H, the contact point between the hook 36 and the coupling portion 41 serving as the point of effort I, and the contact point between the one of the rollers 45 in each pair and the annular assembly 57 serving as the point of action J. This allows the power of the air cylinder 31 to be increased and transmitted to the large-gear bearing end lid 8.

The annular assembly 57 is provided with the rod attachment portions 52, which are arranged on a diagonal line passing on the center of the annular assembly 57 and extend from the annular assembly 57 toward the radially outer side. The rod attachment portions 52 are each connected to an end of the rod 53, which extends toward the gear unit 100. The rods 53 have the other ends, on each of which the threaded portion 54 is formed, and the threaded portions 54 are inserted into the bolt insertion holes 8*a* of the large-gear bearing end lid 8 (see FIG. 6). The threaded portions 54 are male threaded, and by screwing the threaded portions 54 into the bolt insertion holes 8*a*, the power transmission mechanism 50 is fixed to the large-gear bearing end lid 8.

The assembly procedure of the end play measurement apparatus 70 will now be described. As illustrated in FIG. 6, the flexible shaft coupling 3 is detached from the main motor 5, and the gear case 7 is turned. Then, (1) the power generation unit 30 is temporarily fixed on the large-gear shaft 4, and (2) the rods 53 and the annular assembly 57 are assembled to the gear case 7. (3) The position of the power generation unit 30, which has been temporarily fixed, is adjusted, and the booster mechanism 40 is attached to the power generation unit 30.

The measurement operation with the end play measurement apparatus 70 will now be described with reference to FIG. 8. In FIG. 8, the end play measurement apparatus 70, which has been assembled according to the procedure described above, is illustrated. In FIG. 8 (*a*), the operation to pull the gear case 7 is illustrated; in FIG. 8 (*b*), the operation to push the gear case 7 is illustrated.

In FIG. 8 (*a*), when the power transmission portion 37 is moved in the direction of the arrow E in the figure (toward the power generation unit 30) by the operation on an operation section 34, the force P1 at the point of effort I is increased at the point of action J according to the "principle of the lever" described above. The large-gear bearing end lid 8 is pulled toward the power generation unit 30 with the increased force P2. By this operation, the outer ring 23 and the rollers 21 of the bearing 20 that is located in the gear unit 100 on the side opposite from the power generation unit 30 (the right side of the gear unit 100) come into contact with each other (see reference sign K). At this point in time, the gear case 7 of the gear unit 100 is at the position closest to the power generation unit 30 (the leftmost position). The position of the gear case 7 relative to the large-gear shaft 4 at this point in time is measured with a dial gauge or the like (not shown).

Subsequently, in FIG. 8 (*b*), when the power transmission portion 37 is moved in the direction of the arrow F in the figure (toward the gear unit 100), the force P1 at the point of effort I is increased at the point of action J in a similar manner to the description above. The large-gear bearing end lid 8 is pushed toward the side opposite from the power generation unit 30 with the increased force P2. By this operation, the outer ring 23 and the rollers 21 of the bearing 20 that is located in the gear unit 100 on the power generation unit 30 side (the left side of the gear unit 100) come into contact with each other (see reference sign L). At this point in time, the gear case 7 of the gear unit 100 is at the position farthest from the power generation unit 30 (the rightmost position). The position of the gear case 7 relative to the large-gear shaft 4 at this point in time is measure with a dial gauge or the like (not shown).

A relative displacement of the large-gear shaft 4 and the gear unit 100 in the axial direction can be obtained from the distance from the measured leftmost to rightmost positions. This relative displacement is measured as end play of the bearing 20. As described above, the end play measurement apparatus 70 according to the present embodiment is fixed to the large-gear shaft 4 and the gear case 7. Then, the gear case 7 is displaced in a manner relative to the large-gear shaft 4 and the resulting displacement is measured. In this manner, the end play of the gear unit 100 as used in a vehicle can be measured.

Merely pushing and pulling the large-gear bearing end lid 8 may result in a measurement error due to nonuniformity in the orientations of the rollers 21. Thus, it is desirable that "roller orienting work" be performed each time when the large-gear bearing end lid 8 is pulled and when it is pushed. The "roller orienting work" is work to make the orientations of the rollers 21, which are fitted in the retainer 24, uniform, and it is performed by holding the hanger seat portion 12 of the gear case 7 (see FIG. 6) and rotating the gear case 7 in the circumferential direction. In the end play measurement apparatus 70 according to the present embodiment, the power transmission mechanism 50, which is fixed to the large-gear bearing end lid 8, is supported by the rollers 45 rotatably in the circumferential direction. This enables the gear case 7 to be rotated with an axial load due to the force P2 applied and thereby the "roller orienting work" to be performed efficiently.

As described above, the end play measurement apparatus 70 according to the present embodiment is the end play measurement apparatus 70 that measures end play of a tapered roller bearing (the bearing 20) of the gear unit 100. The gear unit 100 supports a rotation shaft (the large-gear shaft 4), with which a gear is fitted, via the tapered roller bearing. The end play measurement apparatus 70 includes the power generation unit 30, which is fixed to the rotation shaft and generates power to move the gear unit 100 backward and forward in the axial direction, and the position change unit 60, which is interposed between the power generation unit 30 and the gear unit 100 and changes the axial position of the gear unit 100 by using the power of the power generation unit 30. This configuration allows effective use of the limited space under the vehicle floor such that the end play can be measured with the gear unit 100 as placed on the truck frame 1. This eliminates the work to remove the gear unit 100 from the truck frame 1 and the work to re-attach the gear unit 100 to the truck frame 1 after the measurement of the end play and, thus, can reduce the work time and the work cost significantly in comparison with the measurement of end play by the conventional technique.

Additionally, the position change unit 60 includes the booster mechanism 40, which is positioned so as to be astride the rotation shaft and is formed into a substantially U-shape having ends that are coupled to the power generation unit 30 and a free end that receives power of the power generation unit 30 to boost the power, and the power transmission mechanism 50, which includes the annular assembly 57 and the rods 53 and transmits the force boosted by the booster mechanism 40 to the gear unit 100. The annular assembly 57 includes members (the segmented members 51 and 56) that are arranged such that the rotation shaft is interposed between these members and coupled to each other in the circumferential direction. The rods 53 each have an end that is connected to the annular assembly 57 and the other end that is fixed to the gear unit 100. The booster mechanism 40 includes the rollers 45, which sandwich the power transmission mechanism 50 in such a manner that the power transmission mechanism 50 can rotate in the circumferential direction. This configuration enables the gear case 7 to be rotated with an axial load applied and thereby the "roller orienting work" to be performed efficiently.

While the configuration example of the end play measurement apparatus 70 described in the present embodiment includes the power transmission mechanism 50 that is rendered rotatable with the rollers 45, the end play measurement apparatus 70 may be configured, for example, without the power transmission mechanism 50 and the rollers 45 such that the rods similar to the rods 53 are fixed to the support sections 44 of the booster mechanism 40. Specifically, the position change unit 60 may include a booster mechanism that is positioned so as to be astride the rotation shaft and is formed into a substantially U-shape having ends that are coupled to the power generation unit and a free end (the coupling portion 41) that receives the power of the power generation unit 30 to boost the power and transmit the resultant power to the gear unit 100. This booster mechanism corresponds to the booster mechanism 40, illustrated in FIG. 7, that is improved. Such a configuration also allows end play of the gear unit 100 as used in a vehicle to be measured and simplifies the structure of the end play measurement apparatus 70, thereby enabling the end play measurement apparatus 70 to be manufactured at low cost.

While the configuration example of the end play measurement apparatus 70 described in the present embodiment includes the position change unit 60, the end play measurement apparatus 70 may be configured, for example, without the position change unit 60 such that the power transmission portion 37 is directly fixed to the gear unit 100. Specifically, the end play measurement apparatus 70 may include the power generation unit 30, which is fixed to the rotation shaft and generates power to move the gear unit 100 backward and forward in the axial direction, and a power transmission member that is connected to the power generation unit and transmits the power of the power generation unit to the gear unit 100. This power transmission member corresponds to the booster mechanism 40, illustrated in FIG. 7, that is improved. Note that this configuration desirably includes two pieces of the power generation unit 30 that are formed on a concentric circle having its center on the center of the large-gear shaft 4 at regular intervals. Operating the power generation units 30 simultaneously enables the measurement operation described with reference to FIG. 8. Such a configuration also allows end play of the gear unit 100 as used in a vehicle to be measured and enables further simplification of the structure of the end play measurement apparatus 70, thereby enabling the end play measurement apparatus 70 to be manufactured at low cost.

While the configuration example of the end play measurement apparatus 70 described in the present embodiment uses the end play measurement apparatus 70 with the gear unit 100 including the quill shaft 13, the end play measurement apparatus 70 according to the present embodiment may be used with a gear unit that does not include the quill shaft 13, in other words, a gear unit including a gear that is connected to the rotation shaft directly.

These embodiments of the present invention represent some examples of the present invention. Combinations with further publicly known techniques can be made, and modifications, including partial deletions, can be made without departing from the spirit of the present invention.

INDUSTRIAL APPLICABILITY

As described above, the present invention can be applied to an apparatus that measures end play of a bearing and is particularly useful as the present invention enables further reduction in work time and work cost involved in the measurement of end play.

REFERENCE SIGNS LIST

1 truck frame, 2 small-gear shaft, 3 flexible shaft coupling, 4 large-gear shaft, 5 main motor, 6 wheel, 7 gear case, 8 large-gear bearing end lid, 8a bolt insertion hole, 8b annular portion, 9 large gear, 10 small gear, 11 small-gear bearing end lid, 12 hanger seat portion, 13 quill shaft, 20 tapered roller bearing, 21 tapered rollers, 22 inner ring, 23 outer ring, 24 retainer, 30 power generation unit, 31 air cylinder, 32 fixing section, 33 fixing section, 34 operation section, support section, 36 hook, 37 power transmission portion, 38 bolt, 39 annular assembly, 40 booster mechanism, 41 coupling portion, 42 arm portion, 42a other end, 42b end, 43 bolt, 44 support section, 45 roller, 50 power transmission mechanism, 51 segmented member, 52 rod attachment portion, 53 rod, 54 threaded portion, 55 bolt, 56 segmented member, 57 annular assembly, 57a axial end face, 60 position change unit, 70 end play measurement apparatus, 100 gear unit, 200 drive system, H fulcrum, I point of effort, J point of action.

The invention claimed is:

1. An end play measurement apparatus that measures end play of a tapered roller bearing of a gear unit that supports a rotation shaft via the tapered roller bearing, the rotation shaft being fitted with a gear, the apparatus comprising:
    a power generation unit that is fixed to the rotation shaft and generates power to move the gear unit backward and forward in an axial direction; and
    a position change unit that is interposed between the power generation unit and the gear unit and changes an axial position of the gear unit by using the power of the power generation unit,
    wherein the position change unit comprises a booster mechanism that is positioned so as to be astride the rotation shaft and is formed into a substantially U-shape having ends that are coupled to the power generation unit and a free end that receives power of the power generation unit to boost the power and transmit the resultant power to the gear unit.

2. An end play measurement apparatus that measures end play of a tapered roller bearing of a gear unit that supports a rotation shaft via the tapered roller bearing, the rotation shaft being fitted with a gear, the apparatus comprising:
    a power generation unit that is fixed to the rotation shaft and generates power to move the gear unit backward and forward in an axial direction; and
    a position change unit that is interposed between the power generation unit and the gear unit and changes an axial position of the gear unit by using the power of the power generation unit,
    wherein the position change unit comprises:
    a booster mechanism that is positioned so as to be astride the rotation shaft and is formed into a substantially U-shape having ends that are coupled to the power generation unit and a free end that receives power of the power generation unit to boost the power; and
    a power transmission mechanism that comprises an annular assembly and a plurality of rods and transmits a force boosted by the booster mechanism to the gear unit, the annular assembly comprising a plurality of members that are arranged such that the rotation shaft is interposed between the members and that are coupled to each other in a circumferential direction, the rods each having an end that is connected to the annular assembly and the other end that is fixed to the gear unit, wherein the booster mechanism comprises rollers that sandwich the power transmission mechanism in such a manner that the power transmission mechanism is able to rotate in the circumferential direction.

\* \* \* \* \*